United States Patent [19]

Lambert et al.

[11] Patent Number: 4,968,443

[45] Date of Patent: Nov. 6, 1990

[54] ANTISTATIC LAUNDRY DETERGENT COMPOSITION AND PROCESSES THEREFOR

[75] Inventors: Pierre M. Lambert, Cortil Wodon; Eduardo E. Puentes-Bravo, Alleur; Marcel J. Gillis, Argenteau, all of Belgium; Harold E. Wixon, New Brunswick, N.J.; Alain M. Gourgue, Lincent; Geneviéve P. Bonnechere, Awans, both of Belgium

[73] Assignee: Colgate-Palmolive Company, Piscataway, N.J.

[21] Appl. No.: 222,992

[22] Filed: Jul. 22, 1988

[51] Int. Cl.$^5$ .......................................... D06M 13/44
[52] U.S. Cl. .................................... 252/8.8; 252/524; 252/534; 252/553; 252/542; 8/115.6
[58] Field of Search ............... 252/542, 524, 534, 553, 252/8.8; 8/115.6; 548/352

[56] References Cited

U.S. PATENT DOCUMENTS

| | | | |
|---|---|---|---|
| 2,267,965 | 12/1941 | Wilson | 548/352 |
| 2,268,273 | 12/1941 | Wilkes | 428/274 |
| 3,313,825 | 4/1967 | Rosenberg | 548/352 |
| 3,316,232 | 4/1967 | McGann | 264/166 |
| 4,196,104 | 4/1980 | Oguagha | 252/542 |
| 4,770,815 | 9/1988 | Baker | 252/140 |
| 4,786,422 | 11/1988 | Kern | 252/8.8 |

OTHER PUBLICATIONS

Chemical Abstracts, vol. 84, p. 83, 61089s, (1976).

Primary Examiner—John F. Niebling
Assistant Examiner—Isabelle R. McAndrews
Attorney, Agent, or Firm—Bernard Lieberman; Murray M. Grill; Robert C. Sullivan

[57] ABSTRACT

An antistatic particulate laundry detergent composition comprises synthetic organic detergent, preferably sodium linear dodecylbenzene or sodium linear tridecylbenzene sulfonate, inorganic and/or organic builder for the detergent, preferably sodium tripolyphosphate and/or zeolite builder, and higher alkyl or alkylbenzene hydroxyethyl imidazoline of the formula

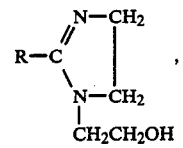

wherein R is an alkyl or alkylbenzene of 8 to 24 carbon atoms preferably stearyl, which detergent composition is of improved detergency due to the presence therein of the higher alkyl or alkylbenzene hydroxyethyl imidazoline antistat. In preferred detergent compositions of this type bentonite is desirably present for its fabric softening activity, and such activity is improved by the presence of the higher alkyl or alkylbenzene hydroxyethyl imidazoline, which also possesses fabric softening properties. When low phosphorus contents of detergent compositions are not required by law or regulation, contents of zeolites and other non-phosphate builders may be omitted and increased proportions of tripolyphosphate may be employed, instead.

The mentioned detergent compositions are useful to wash soiled laundry and to make it softer and static-free, whether such washing is with American or European washing machines and in accordance with such practices. Unexpected improvements in soil removal, as measured visually and by reflectometer, are noted after the washing of laundry that had been stained with oily soils, and the washed laundry is softer.

Also described in a process for manufacturing detergent compositions comprising synthetic anionic organic detergent, zeolite, tripolyphosphate and the mentioned imidazoline, in which an aqueous crutcher mix is made, to which the zeolite is added before the tripolyphosphate, and the imidazoline is added immediately after the tripolyphosphate, thereby avoiding undesirable reaction of the imidazoline with the zeolite, which reaction has a negative effect on antistatic and fabric softening properties of the resulting product. The product is obtained in particulate solid form by spray drying of the crutcher mix in conventional manner. Various other active and adjuvant components of the detergent composition may be post-added with the spray dried beads or may be incorporated in the crutcher mix.

23 Claims, No Drawings

ANTISTATIC LAUNDRY DETERGENT COMPOSITION AND PROCESSES THEREFOR

This invention relates to antistatic laundry detergent compositions. More particularly, it relates to such compositions which comprise a synthetic organic detergent, a builder for such detergent, and a higher alkyl hydroxyethyl imidazoline. Such compositions have been found to be of improved detergency, especially against oily soils, and often are of improved fabric softening properties, in addition to being satisfactorily antistatic, so that laundry washed with the invented compositions is satisfactorily cleaned, softened and made antistatic. The invention also relates to a manufacturing process wherein spray dried detergent composition beads may be made from a crutcher mix which includes zeolite builder, and any undesirable reaction between such builder and the higher alkyl hydroxyethyl imidazoline antistatic agent is minimized or prevented.

Spray dried particulate detergent compositions containing antistatic agents are well known, and such compositions may often also possess fabric softening properties. Quaternary ammonium salts have been employed in such compositions as antistatic and fabric softening agents but preferably are post-added to spray dried detergent composition beads or spray dried base beads to avoid any interaction between such cationic compounds and reactive constituents of the aqueous crutcher mix, such as anionic detergent, zeolite and various builder salts. It has been found that although useful antistatic particulate detergent compositions may be made by processes which utilize such post-addition of a quaternary ammonium salt as an antistatic and fabric softening agent, improved fabric softening effects on laundry are obtainable from such detergent compositions when such agent is more uniformly distributed throughout the composition, as happens when the antistat is spray dried from a crutcher mix which contains the other detergent composition components (or most of them). However, when the detergent component of the composition includes anionic detergent, quaternary ammonium salts react with such detergent in the aqueous medium in the crutcher, and the reaction product tends to be deposited on washed laundry in objectionable greasy spots. In many instances significant fractions of the antistatic and fabric softening properties of the quaternary ammonium salt are lost due to the mentioned reaction. Thus, spray drying of a crutcher mix containing anionic detergent and quaternary ammonium salt antistat is desirably avoided and as a result thereof when such antistat is employed in anionic detergent compositions it is post-added to or post-sprayed onto particulate detergent composition beads or base beads resulting in a less effective distribution of the antistat throughout the particulate composition. Undesirable reactions similar to those recited above also may result between quaternary ammonium compounds and builders.

To avoid the described negative reactions efforts have been made to replace quaternary ammonium salts with other antistats so that spray dried particulate detergent compositions containing the antistat uniformly distributed throughout the spray dried beads may be made. Thus, diammonium compounds, sometimes called di-quaternary ammonium salts (hereafter "diquats") have been employed as antistatic compounds in anionic detergent compositions, and have been incorporated in the crutcher mixes from which such detergent compositions were spray dried. However, although useful particulate antistatic detergent compositions can be made by such processes, employing such diquats, sometimes undesirable reactions may occur and to avoid them it is often desirable to employ high solids content (low water content) crutcher mixes, and short residence times in the crutcher. Such high solids mixes may be difficult to mix, pump and spray, and the need for short residence times may unduly limit the flexibility of processing operations, because sometimes crutcher mixes will have to be held for more than normal mixing times, due to delays encountered, as in packaging and spray drying operations. Therefore, although diquats have been found to be compatible with anionic detergents in crutcher mixes under certain conditions, their use still can present processing problems, and attempts have been made to overcome these.

It has been found by the present inventors that their particulate detergent compositions, which may contain anionic detergent, water soluble and/or water insoluble builder, and bentonite, plus various other normal detergent composition adjuvants, including fillers, overcome the disadvantages of "control" compositions, such as those incorporating quaternary ammonium salts and/or diquats as antistatic agents. Thus, spray dried particulate detergent compositions may be made from crutcher mixes containing applicants' antistatic agent and the crutching conditions do not have to be as tightly controlled as when diquat antistat is present in the crutcher mix. The particulate detergent compositions resulting are satisfactorily antistatic and surprisingly, are of improved detergency, especially against oily soils. Additionally, fabric softening action is maximized in those detergent compositions containing both bentonite and the imidazoline antistat.

In accordance with the present invention an antistatic laundry detergent composition of improved detergency, due to higher alkyl or alkylaryl hydroxyethyl imidazoline being a component thereof, comprises a detersive proportion of a synthetic organic detergent, a building proportion of an inorganic or organic builder for the detergent, and an antistatic proportion of a higher alkyl or alkylaryl hydroxyethyl imidazoline of the formula

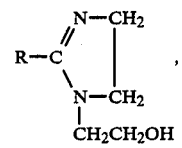

wherein R is an alkyl or alkylaryl of 8 to 24 carbon atoms. Preferably the synthetic organic detergent is an anionic detergent, such as sodium linear dodecylbenzene sulfonate or sodium linear tridecylbenzene sulfonate, the builder for the detergent includes sodium tripolyphosphate, with Zeolite A being present as a supplemental builder when the tripolyphosphate content is insufficient for optimum building effect, and the higher alkyl or alkylaryl hydroxyethyl imidazoline is one in which R is higher linear alkyl, such as of 16 to 18 carbon atoms, e.g., stearyl. Also within the invention is a process for manufacturing such detergent compositions, which comprises making an aqueous crutcher mix by addition of the imidazoline component after the tripolyphosphate component, which is added to the crutcher after the zeolite, anionic detergent and water.

The closest prior art known to applicants may be exemplified by U.S. Pat. Nos. 4,294,710 and 4,536,316, U.S. patent application Ser. No. 06/876,999, and Technical Bulletin 280E, entitled Monazolines, issued January, 1984, by Mona Industries, Inc. U.S. Pat. No. 4,536,316 describes a fabric softening particulate detergent composition which comprises sodium tridecylbenzene sulfonate, pentasodium tripolyphosphate, quaternary ammonium halide and bentonite. In the body of the patent it is disclosed that zeolites may also be employed as builders, together with various other detergent composition adjuvants. The patent implicitly recognizes the undesirable reactivity of quaternary ammonium halides with anionic detergents in aqueous crutcher mixes by teaching the post-addition of quaternary ammonium halide on bentonite to a spray dried base bead containing anionic detergent.

U.S. Pat. No. 4,294,710 describes detergent compositions which comprise organic detergent, water soluble builder salt and tertiary amine. The patent also mentions crystalline sodium aluminosilicate builders (zeolites) and smectite clays (including bentonite) for fabric softening effects, in preferred fabric softening detergent compositions. However, the imidazoline derivatives described in this patent are significantly different from those in the compositions of the present invention and applicants' imidazolines are not described or suggested in the patent.

U.S. patent application Ser. No. 06/876,999 describes a fabric softening and antistatic particulate detergent composition that may be manufactured by spray drying of a crutcher mix which incorporates anionic detergent and diquaternary ammonium salt. However, as was previously indicated, the solids content of such a crutcher mix should be kept high and the residence time in the crutcher will normally be minimized to prevent undesired reactions between the anionic detergent and the diquat.

The Monazolines bulletin discloses 1-hydroxyethyl2-alkyl imidazolines wherein the alkyls may be of 7 to 17 carbon atoms, and the bulletin mentions that the Monazoline salts and quaternaries function as antistatic agents and states that they impart softening characteristics to cotton, wool and rayon. The bulletin also mentions that such compounds adhere tenaciously to fabrics and leave a residual coating thereon that is resistant to repeated laundering operations. Use of certain Monazolines in acid dairy cleaners is recommended in the bulletin for their removal of milkstone and protein matter. Such monazolines are said to have good emulsifying properties at low concentrations. The bulletin also indicates that when the imidazolines are neutralized with acids the salts resulting may be classified as cationic surface active agents. Although the Monazolines bulletin suggests the inclusion of such compounds in detergent compositions the bulletin does not mention applicants' compositions nor does it describe or suggest the improved detergency and improved fabric softening obtained with such compositions. Furthermore, it doesn't mention or suggest applicants' improved manufacturing process.

The synthetic organic detergents employed to make the compositions of the present invention include anionic, nonionic, ampholytic and zwitterionic detergents but the anionic detergents are preferred because they are especially suitable for washing laundry that has been soiled with particulate soils, such as clay soils. Nonionic detergents may also be included in the present compositions, and they are especially useful in removing oily soils from laundry. The imidazoline antistats of the present compositions complement the actions of the anionic detergents by improving the detergency of the invented compositions vs. oily soils.

The various types of synthetic organic detergents are well known in the art and are described at length in the text *Surface Active Agents and Detergents*, Vol. II, by Schwartz, Perry and Berch, which was published in 1958 by Interscience Publishers, Inc. The listings of such detergents in such text (at pages 25-138) are hereby incorporated by reference, as is the description of such detergents that appears in U.S. patent application No. 06/876,999, filed June 27, 1986, which was previously mentioned herein.

The preferred anionic synthetic organic detergent component of the invented compositions is usually employed in a soluble salt form, preferably as a sodium salt. Although other types of anionic detergents may be utilized, such as sodium higher fatty acyl sarcosides, the preferred water soluble synthetic organic anionic detergents employed are those which are described as of a sulfonate or sulfate type, and they may be designated as sulf(on)ates. Such include branched and linear higher alkylbenzene sulfonates (the linear compounds are preferred), higher fatty alcohol sulfates, higher fatty alcohol polyethoxylate sulfates, olefin sulfonates and paraffin sulfonates. An extensive listing of anionic detergents, including such sulfate and sulfonate detergents, appears in the Schwartz et al. text, previously mentioned. Usually the higher alkyl or higher aliphatic group of such detergents, especially the alkylbenzene sulfonates, is of 10 to 18 carbon atoms, preferably 12 to 14 or 15 carbon atoms, and the ethoxylate contents of such detergents that are ethoxylated will preferably be in the range of 3 to 30 ethoxy groups per mole. When the anionic detergent is the highly preferred higher alkylbenzene sulfonate, the higher alkyl lipophile will preferably be linear and of 12 or 13 carbon atoms, and the cation thereof will preferably be sodium.

The nonionic detergent which may be employed as a component of the present compositions may be any suitable such detergent but is preferably a poly-lower alkoxylated higher alkanol wherein the alkanol is of 8 to 22 carbon atoms, preferably 10 to 18 carbon atoms, and more preferably 11 to 15 carbon atoms, and wherein the number of moles of lower alkylene oxide (of 2 or 3 carbon atoms) is from 3 to 20. Of such materials it is preferred to employ those wherein the higher alkanol is a higher fatty alcohol of 11 to 17 carbon atoms and which contain from 5 to 13 lower alkoxy groups per mole. Preferably, the lower alkoxy group is ethoxy but in some instances it may be desirably mixed with propoxy, the latter, if present, usually being a minor (less than 50%) constituent. Exemplary of such compounds are those wherein the alkanol is a primary alkanol of 12 to 15 carbon atoms and which contain about 7 ethylene oxide groups per mole, e.g., Neodol ® 25-7, and Neodol 23-6.5, which products are made by Shell Chemical Company, Inc. Other examples of such detergents are those sold under the Union Carbide Corp. trademark, Tergitol ®. A preferred nonionic of similar type, employed as a detergent supplementing an anionic detergent, is of 13 to 17 carbon atoms in the alkanol and of about 11 ethoxies.

Zwitterionic detergents such as the betaines and sulphobetaines are also useful as are empholytic detergents, such as alkyl betaiminodipropionates, alkyl betaaminopropionates, and long chain imidazole derivatives, but usually such detergents will be used to supplement anionic detergents, which will be the primary detergents present.

Laundry detergent compositions will include builders to improve detergency of the synthetic organic detergent component. Such builders may be inorganic and/or organic and may be water soluble and/or water insoluble. As with the other types of required components of the present compositions, it is often desirable to employ mixtures. Among the water soluble builders of the inorganic type the best known and most effective is sodium tripolyphosphate (preferably with a major proportion thereof of Phase II) but other water soluble salts of polyphosphoric acids may be employed, as may be pyrophosphates, carbonates, bicarbonates, borates, and silicates. Preferably, the cation of such salts is sodium.'- 'Mixed" silicates and "mixed" carbonates may also be employed, such as sodium sesquisilicate and sodium sesquicarbonate. Water soluble organic builders are also useful, including nitrilotriacetate (NTA), polycarboxylates, e.g., Sokalan ®CP5 (from BASF), and polyacetal carboxylates (supplied by Monsanto Corporation under the name "Builder U"). Most prominent among the water insoluble inorganic builders are the zeolites, although other sodium aluminosilicates may also be useful. Of the zeolites, those with ion exchange capacities over 100, preferably over 200 mg. equivalents of calcium carbonate hardness per gram of anhydrous zeolite, are better for our purposes. Although various zeolites may be employed, such as those designated A, X and Y, the preferred zeolite is Zeolite 4A. Such zeolite is crystalline and contains about 20% (15 to 25%) thereof of water of hydration.

For laundry detergent compositions that are to be marketed in areas where the content of phosphorus in such products is not limited by law or regulation, it may often be desirable to employ sodium tripolyphosphate as the primary or even sole builder for the anionic detergent, but even under some such circumstances supplemental builders, such as sodium silicate and sodium carbonate, may also be present. When the content of phosphorus in laundry detergents is limited by law it has sometimes been found preferable to make up for the required decrease in sodium tripolyphosphate content by utilizing a zeolite as the primary builder, together with a decreased proportion of tripolyphosphate but in such cases it will also usually be desirable to have present supplemental builders, such as silicate and carbonate.

The higher alkyl or alkylaryl hydroxyethyl imidazoline antistatic agent of the present compositions is of the formula

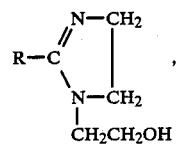

wherein R is an alkyl or alkylaryl, which are preferably of 8 to 24 carbon atoms. Such formula represents the unneutralized imidazoline but salts thereof may be made by reacting such imidazoline with a suitable acid, such as hydrochloric acid, acetic acid, tartaric acid, methosulfuric acid, and other suitable neutralizing acids for such compounds. Such imidazoline salts may be employed interchangeably with the imidazolines because in an alkaline crutcher mix it is expected that the free imidazoline will result. Other variations may be made in the imidazolines too, including substitutions of other hydroxy-lower alkyls, such as hydroxymethyl, hydroxypropyl and hydroxybutyl, for hydroxyethyl, and substitutions of polyethoxyalkanols (usually up to no more than ten, or five moles per mole of imidazoline) for the hydroxyethyl. In the imidazolines R may be joined to the heterocyclic ring carbon at either the alkyl or aryl group (and the aryl is preferably phenyl). R is preferably higher alkyl, such as of 12 to 18 carbon atoms, and is preferably saturated. More preferably R is of 16 to 18 carbon atoms and saturated, and most preferably it is stearyl. Although such stearyl may be of 18 carbon atoms it will often include some palmityl, since it may be derived from commercial stearic acid (which includes palmitic acid) or hydrogenated stearic acid, so the average carbon atom content of R can be about seventeen.

In addition to the three required component of the present detergent compositions, detergent, builder and imidazoline, there will also be present in most commercial formulations various adjuvants, which are considered to be desirable components of the compositions because they contribute desirable properties to it. In a broad sense, moisture (water) and fillers are also adjuvants but they will be considered separately herein, with respect to proportions thereof in the present compositions. For such materials and some others certain ranges of proportions thereof may be specified herein for preferred detergent compositions.

A highly preferred component, which may be considered to be in the general class of adjuvants, is bentonite, which is useful for its fabric softening properties, which properties may be augmented to an unexpectedly beneficial extent by the presence of higher alkyl or alkylaryl hydroxyethyl imidazoline in the laundry composition. Bentonite is a naturally occurring smectite clay of the monomorillonite type. It may be present in nature as sodium bentonite, which is often referred to as a swelling bentonite, often swelling in water to more than 3 ml:/g., or as a calcium or magnesium bentonite, which bentonites are non-swelling but may be converted to swelling bentonites by suitable treatment, as with sodium carbonate. The swelling or sodium bentonites are usually preferred as components of detergent compositions because they exert a lubricating or softening effect on laundry washed with such compositions. The particle sizes of the bentonite will usually be no larger than No. 140 sieve (U.S. Sieve Series) initially and it is preferred that the particles be small enough to pass through a No. 200 sieve, more preferably through a No. 325 sieve. Fabric softening bentonites of such particle sizes are available from various manufacturers and processors, including: American Colloid Company, Industrial Division; Georgia Kaolin Company; Industria Chimica Carlo Laviosa; Sud Chemie A.G.; and Colin Stewart Minerals, Ltd. ; and some suitable bentonites of such companies are sold under the American Colloid, Mineral Colloid, Laviosa AGB, Laundrosil DG and Quest Bentonite designations, respectively.

Among other adjuvants that are suitable components of the present compositions, some of which may be incorporated in the crutcher mix and others of which may be post-added to spray dried detergent composition beads, base beads or particulate components, there may be mentioned: perfumes; colorants, e.g., pigments and dyes; bleaches, e.g., sodium perborate; bleach activators; bleach stabilizers; soil suspending and anti-redeposition agents, e.g., sodium carboxymethyl cellulose (CMC); fluorescent brighteners, such as the stilbene and distilbene brighteners; foam boosters and foam stabilizers, such as higher fatty alkyl lower alkanolamides; anti-tarnish agents; buffers and pH adjusting agents; enzymes, such as proteolytic and amylolytic enzymes; flow aids, such as starch derivatives and special clays, e.g. those sold under the trademarks Satintone ® and Microsil ®, and magnesium silicates; foam limiting agents, such as sodium higher fatty acid soaps; sequestrants, such as sodium ethylenediamine tetraacetate; antistatic agents, such as quaternary ammonium chloride; polyelectrolytes and polymeric additives, such as Sokalan ® CP5 (acrylic-maleic copolymer); soil release promoting agents, such as polyethylene terephthalate—polyoxyethylene terephthalate copolymers; anti-foam agents, such as silicones; anti-wetting agents, such as siliconates; water; and fillers, such as sodium sulfate.

Water is present in all commercial particulate laundry detergent compositions, often because it is present in components of such compositions and because spray dried particles normally contain some water from the crutcher mix. The water may perform a binding function, helping to promote crystallization of various inorganic salts present, which often tends to bind together the individual spray dried beads, and it may act as a plasticizer, preventing the beads from becoming unduly brittle and subject to disintegration on handling. The water charged to the crutcher or employed to dissolve components of the detergent composition is usually preferably deionized water but tap waters can also be utilized. When sodium sulfate is employed as a filler it can exert a binding effect on the detergent composition beads and often it acts as a bodying agent for such beads. Some of the sodium sulfate in the final product may have derived from the anionic detergent employed because it is the principal product of the neutralization of sulfuric acid, that usually is present with the detergent acid.

The detersive proportion of synthetic organic detergent will normally be in the range of 1 to 30%, preferably being 2 to 30% or 2 to 25%, more preferably 4 to 20% or, as when the syntheti detergent is sodium linear alkylbenzene sulfonate of 12 to 13 carbon atoms in the alkyl, being in the range of 10 to 20% or 5 to 12%, e.g., about 15% or about 7%. In many cases the higher proportions of detergent are present in those compositions that contain more phosphate builder.

The building proportion of inorganic and/or organic builder for the detergent will normally be in the range of 5 to 60% but when a light duty detergent composition is to be made, which is more suitable for use on more delicate fabrics, the proportion of builder may be decreased or even omitted. For the built laundry detergent compositions the content of builder will be in the range of 3 to 60% of water soluble builder salt (usually inorganic) and 2 or 5 to 30% of water insoluble zeolite builder, for those detergent compositions in which mixed water soluble and water insoluble builders are employed (and in which the phosphate content may thereby be lowered). In such compositions it is preferred to utilize 5 to 50% of water soluble inorganic builder salt (which may include sodium tripolyphosphate, sodium silicate and sodium carbonate, and mixtures thereof, sometimes also including other builders, too), and 5 to 30% of water insoluble builder, such as hydrated Zeolite A. Even more preferred such compositions include 5 to 30% of the water soluble inorganic builder salt and 5 to 25% of the insoluble builder and in an example of such a composition there are present about 7% of sodium tripolyphosphate, 5% of sodium silicate ($Na_2O:SiO_2=1:2$) and 2% of sodium carbonate, together with 16% of Zeolite A (hydrated with about 20% of water). When there is no requirement to limit the content of phosphates in the detergent compositions, so that zeolite or other water insoluble builder is unnecessary to increase building power in the absence of a "normal" proportion of phosphate builder, the proportion of water soluble builder may be in the range of 5 or 10 to 60%, preferably being in the range of 15 to 40%, more preferably 15 to 30%, e.g., about 25% (including 24–27%), and most or all of that may be polyphosphate.

The antistatic proportion of higher alkyl or alkylaryl hydroxyethyl imidazoline of the present detergent compositions will normally be in the range of 0.5 to 10%, preferably 1 to 7% and more preferably 1 to 4% or 2 to 7%, e.g., 2%, 5%, such depending on whether the detergent is phosphate-zeolite built or phosphate built. Of the ranges given the 1–4% range may also be preferred for high phosphate built products that also contain quaternary ammonium salt antistat.

The fabric softening proportion of bentonite may be in the range of 5 to 30% and preferably is in the range of 10 to 20 or 22%, e.g., 16%, but especially because of improvements in softening due to the presence of the imidazoline component, the bentonite content of preferred compositions may be lowered, if desired, from the ranges mentioned, down to near the lower limit of 5%, but preferably will be no lower than 8%. However, when quaternary ammonium antistat is also present (in lesser proportion than needed if it is the only antistat) the bentonite content may be further decreased, and sometimes it may be omitted (if sufficient softening is obtained without it). The proportion of quaternary ammonium salt that is optionally present in the invented compositions is usually in the range of 1–5%, preferably 2–4%, e.g., about 3%, but may vary depending on the other components and the extents of antistatic and softening effects wanted.

The water content of the particulate laundry detergent composition may be adjusted so as to obtain the best properties of the product (good flowability without brittleness, good binding, particle strength, and plasticizing effect without stickiness). Normally the water content in the final particles (and also in the spray dried beads, before postadditions) will be in the range of 3 to 20%, preferably 5 to 12% and more preferably 6 to 10%, e.g., about 8.5%. Filler content (usually of sodium sulfate alone, the most preferred filler) will normally be in the range of 0 or 1 to 50%, preferably 5 to 40%, e.g., about 20 or 30%. Although the filler content may depend on the contents of active components and various adjuvants present, being increased or decreased as such are decreased or increased, the filler, especially sodium sulfate, helps to produce a strong flowable product and so it has desirable adjuvant functions, too. However, if desired, it may be omitted from certain products, such as those which are of the "concentrated detergent" type.

Among the adjuvants employed that which is normally present in greatest proportion (other than bentonite and, in some cases, water) is bleaching agent (if a bleaching product is desired), such as sodium perborate hydrate (tetrahydrate, monohydrate or other hydrate), the proportion of which will normally be in the range of 5 to 25%, preferably 10 to 20%, e.g., about 14%. Excluding the bleaching agent, water, bentonite and sodium sulfate or other filler, the total content of adjuvants will normally be in the range of 3 to 20%, preferably 5 to 15% and more preferably 8 to 13% (and in all references to adjuvant proportions the contents of the specific "adjuvants" mentioned in this paragraph are excluded).

In the manufacture of the present particulate antistatic laundry detergent compositions the higher alkyl or alkylaryl hydroxyethyl imidazoline is distributed throughout the spray dried detergent composition beads by being crutched with such components of the final composition as are heat stable and crutchable, and by being spray dried from such crutcher mix. By such process better distributions of the imidazoline throughout the detergent composition and in the wash water are obtained, which lead to more efficient antistatic and fabric softening actions thereof. Also, additional melting or dissolving and spraying operations can be avoided, which may be needed to carry out post-additions. In the invented process the aqueous crutcher mix of components of the detergent composition includes synthetic anionic organic detergent, sodium tripolyphosphate builder for the synthetic detergent, and higher alkyl or alkylaryl hydroxyethyl imidazoline. Other components which may be present include other heat stable water soluble and water insoluble builders, fluorescent brighteners, colorants, sequestrants, anti-redeposition agents, polyelectrolytes or polymers, filler, anti-foam agents, such as soap, any supplemental detergents, such as nonionic detergent, and silicone, which helps to densify the crutcher mix.

After the crutcher mix is made it is spray dried, employing a normal concurrent or countercurrent spray drying tower, into which the crutcher mix is pumped and sprayed through spray nozzles (or is converted to droplet form by other atomizing means). The spray dried detergent composition particles are then mixed with any additional components of the final detergent composition, such as bleaching agent, bleach activator, bleach stabilizer, bentonite, enzyme, flow aid, anti-gelling agent, different antistat, and perfume. The resulting mixed particulate detergent composition is then packaged, and is ready for sale and use.

The conditions under which the product is manufactured are essentially the same as conventional manufacturing conditions (with an exception that will be referred to in more detail later). The crutcher mix will normally be of a solids content in the range of 50 to 70% by weight. Although it is often desirable to employ higher solids contents of such mixes to increase spray tower throughput rates and to conserve energy, sometimes, due to equipment and composition limitations, such is not feasible, and other solids content mixes are made, such as those in the 55 to 65% range, e.g., about 60%. It is a feature of the present invention that such crutcher mixes, of higher water contents, as well as those of lower water contents, may be manufactured without adverse reactions occurring between components thereof, such as between zeolite (when present) and the hydroxyethyl imidazoline component. The temperature of the crutcher mix will normally be in the range of 50 to 80° C. and crutching times (including holding times) may be from ten minutes to up to 5 hours, if required. The crutcher mix is usually dropped from the crutcher to a high pressure pump, and is pumped through spray nozzles into hot drying gas, which is normally at a temperature in the range of 200 to 500° C. The globules of liquid phase (containing dispersed material) crutcher mix are dried to free flowing particles of substantially spherical shape, which are of sizes in the range of about No's. 10–100, U.S. Sieve Series, which size range corresponds to screen openings (and particle diameters) in the range of 0.15 to 2 mm. Although it is desired to regulate the spray drying conditions so as to obtain spray dried product within the size range indicated and sometimes in the narrower and sometimes more preferred U.S. Standard Series 20 to 80 sieve range (177 to 841 microns), in some instances products which do not meet such size specifications will be produced and such may be brought within such specifications or within others by screening and other classifying means, in known manner.

A significant advance in the art of manufacturing the described detergent compositions is the discovery that the substituted hydroxyethyl imidazolines that are utilized as antistatic agents in the present products can be incorporated in crutcher mixes to be spray dried without reacting objectionably with other components of the crutcher mix, such as zeolite, anionic detergent and other ionic components. It is well known that quaternary ammonium salts, which have been employed as antistatic agents in detergent compositions, are not desirably crutched with anionic detergents in aqueous media because, being cationic, they react with such detergents to form greasy products which may deposit on the washed laundry, causing objectionable "grease spotting" thereof, and such objectionable reaction also diminishes detergency of the composition by removing anionic detergent from the system. For that reason replacements have been sought for the quaternary ammonium salt antistats so that co-crutching of the antistat with other detergent composition components could be practiced without undue loss of detergency, etc. As a result of such research it was found that "diquats" could be employed as replacements for the quaternary salts. Unfortunately, it has recently been discovered that such diquats can react with anionic and other components of crutcher mixes, and with zeolite builder. Such diquat reaction may be held in check by utilizing higher solids content crutcher mixes and shorter crutching periods (or slurry residence times) but sometimes equipment is not available to crutch and atomize high solids content slurries, and sometimes hold-ups in production, such as on packaging lines, require holding the crutcher mix so much longer that the diquat is reacted with such anionic material or zeolite. By using the higher alkyl hydroxyethyl imidazoline antistat of this invention, instead of "quat" or "diquat", such problems are overcome. An undesirable reaction between zeolite and the hydroxyethyl imidazoline can still occur but such reaction can be prevented by employing the process of this invention.

The invented process applies to making spray dried detergent compositions containing anionic detergent, zeolite builder, phosphate builder, such as sodium tripolyphosphate (which may be accompanied by other builders) and higher alkyl hydroxyethyl imidazoline, all in an aqueous medium, of 50 to 70 or 55 to 65% solids content, e.g., 60%. In the invented process the zeolite is added to water in the crutcher or is added to an aqueous composition containing non-phosphate and non-imidazoline components of the detergent composition prior to addition thereto of phosphate builder. Subsequently, the phosphate builder, preferably sodium tripolyphosphate, is added to the crutcher mix and the imidazoline is added, preferably immediately thereafter (without intervening additions of other components). Following such procedure apparently results in the imidazoline preferentially forming a relatively unstable complex with the sodium tripolyphosphate instead of forming a more stable complex with the zeolite. Thus, when detergent composition particles are added to the wash water in a washing machine they release the hydroxyethyl imidazoline compound, which then exerts its antistatic and fabric softening effects, which would have been significantly diminished had the imidazoline compound been complexed with the zeolite (in addition to the detergent building effect of the zeolite being diminished, too). Following the described procedure one can make an antistatic laundry detergent of the type described herein in which the imidazoline compound is not adversely complexed or reacted with the zeolite when the crutcher mix contains as much as 50% of water and is crutched and/or held for 1 to 5 hours, whereas when using "diquat" such objectionable reaction or complexing could occur. In the compositions made by this process the proportions of anionic detergent, such as sodium linear alkylbenzene sulfonate, zeolite, phosphate builder, such as sodium tripolyphosphate, and alkyl hydroxyethyl imidazoline may be those previously described for the invented detergent compositions, preferably are 1-30, 5-30, 5-50 and 0.5-10, and more preferably are 2-10, 5-25, 5-25 and 1-3, e.g., 7:16:7:2, respectively.

In addition to the processing advantages of the aspect of this invention that was described above, the compositions of the invention also are significantly better than those of the prior art in several important respects. As was previously indicated, when quaternary ammonium salts are employed as antistatic agents (and fabric softeners) they react in the crutcher (and sometimes also in the wash water) with anionic detergent, thereby decreasing cleaning power of the detergent composition, and sometimes adversely affecting the antistatic properties of the quaternary ammonium salts. When diquats are used in replacement of quats such negative effects may be avoided but to accomplish this changes in normal manufacturing processes should be made. Unlike the situations with respect to quats and diquats, when using the present imidazoline compounds (and following the manufacturing procedure described when zeolites are also present in the crutcher mix) no adverse reactions with anionic detergent or zeolite result. Unexpectedly, the detergency of the invented composition is significantly better than for comparable compositions in which the same proportion of diquat is employed in replacement of the imidazoline compound. The improvement in detergency is especially pronounced with respect to removal of oily and greasy soils from laundry, which makes the invented detergent compositions especially useful for washing of mechanics' coveralls and other such laundry containing hard to remove greasy, carbonaceous soils. The invented compositions are also superior to diquat controls in fabric softening properties, when tested on cotton and polyester/cotton fabrics. Such improvements were observed with low phosphate content anionic detergent compositions containing bentonite but are considered to be characteristic of the mentioned imidazoline compound in built particulate anionic laundry detergent compositions (although best results may be those obtained with such compositions that are phosphate built, which may also contain zeolite builder and bentonite fabric softener).

High phosphate content anionic organic detergent compositions containing the mentioned imidazoline compounds as antistatic agents exhibit good fabric softening and antistatic effects, compared to similar compositions in which diquat is used as the antistatic additive. Even when compared to similar compositions containing a quat, such as distearyl dimethyl ammonium chloride, which is post-added to prevent adverse reaction with the detergent, washings of test swatches with wash waters containing the invented compositions give results that are comparable to those obtained with such a control. Further improvements in softening and antistatic effects are obtainable by employing mixtures of the imidazoline compound and quat, such as those previously described in the specification. Also, fabric softening effects of bentonite in the described compositions are improved by the presence of the imidazoline compounds in such compositions.

Another desirable result of employing the present compositions is the improvement in fluffiness of towels and other laundry washed by the invented compositions. Compared to controls that do not contain the substituted hydroxyethyl imidazolines, noticeable improvements in fluffiness are visually apparent and such improvements are confirmed by physical measurements. For example, folded towel heights 10 to 25% greater than those of controls are obtainable.

Although improvements in detergency, fabric softening, fluffing and antistatic characteristics of laundry washed with the invented detergent composition are important, the more important of these properties in various European countries in which "high-temperature" automatic washing machines are utilized but automatic dryers are not, may be improved detergency and fabric softening (with improved fluffing being an additional "bonus"). However, in countries where automatic laundry drying is extensively employed, so that "static cling" on dried laundry, especially laundry items made of synthetic fabrics, can be a problem, the antistatic properties contributed by the present laundry detergent compositions are also important. Thus, while prevention of static cling is a significant property of the invented detergent compositions, even when such characteristic is unnecessary the present substituted hydroxyethyl imidazoline-containing detergent compositions are highly desirable for their better cleaning and fabric softening properties.

Use of the invented detergent compositions is substantially in accordance with normal use of laundry detergents of this general type. In European practice higher concentrations of detergent are employed in washing machine wash water and the wash water temperature is higher, too. Thus, in European washing water temperatures are usually in the range of 20 to 90° C., preferably 50 to 90° C., e.g., about 60° C., detergent composition concentrations are in the range of 0.5 to 2%, preferably 0.8 to 1.5%, e.g., about 1%, and the water hardness will usually be in the range of about 50 to 400 p.p.m., as calcium carbonate, e.g., about 200 p.p.m. In the American practice the concentration of the detergent composition is often about 0.05 to 0.5%, the wash water temperature will be in the range of 10 to 50° C., often being in the range of 20 to 40° C. for "cold water" washing (often used for colored laundry to prevent dye runs), and the water hardness is often in the range of 0 to 300 p.p.m., such as 50 to 150 p.p.m., e.g., about 100 p.p.m. Thus, the overall washing condition ranges, covering European and American practices, are 10 to 90° C. water temperature, 0.05 to 2% detergent composition concentration in the wash water, and water hardness up to 400 p.p.m., as $CaCO_3$. Washing times are in the range of five minutes to two hours, preferably 10 minutes to one hour. In the American practice usually there is no pre-wash but in European practice pre-washes are often employed, although the present desirable results are obtainable without pre-washing.

In the described compositions the best of the known imidazolines are those of the formula given, wherein R is a higher alkyl, at the 1-carbon position, and at the 2-nitrogen position of the heterocyclic ring an imidazoline hydrogen is replaced by hydroxyethyl. However, it is within the inventive concept to utilize other hydroxy-lower alkyls, such as those of 2 to 4 carbon atoms, and it is considered that the hydroxyethyl moiety may be replaced by polyoxyethylene ethanol groups of 2 to 10 ethylene oxide groups, preferably 2 to 4. Also the higher alkyl, preferably linear and saturated, may be replaced by alkylaryl, preferably alkylbenzene of the same carbon atoms content, the alkyl of which is also preferably linear and saturated.

The commercial imidazolines, and in particular, the higher alkyl hydroxyethyl imidazolines, are preferably employed as pure compounds, which are referred to as 100% cyclized. However, because manufacturing reactions often result in the production of some uncyclized product, tests have been made of various commercial products and desirable laundry detergent composition characteristics have been related to the extent of cyclization of the imidazoline. As the result of such tests it was found that it is highly desirable for the higher alkyl hydroxyethyl imidazolines employed to be at least 80% cyclized, and those imidazolines described in the working examples in this specification are of such higher degree of cyclization, unless otherwise indicated.

The following examples illustrate but do not limit the present invention. Unless it is otherwise indicated in such examples, this specification and the claims, all parts are by weight and all temperatures are in ° C.

EXAMPLE 1

| Component | Percent (by weight) |
|---|---|
| Water | 6.0 |
| Zeolite (Type 4A, approximately 20% water of hydration) | 16.0 |
| Sodium linear dodecylbenzene sulfonate | 7.4 |
| Sodium coco - hydrogenated tallow soap (average M.W. = 280) | 5.0 |
| *Nonionic Detergent | 2.0 |
| Fluorescent brightener (stilbene type) | 0.3 |
| Sodium ethylene diamine tetraacetate | 0.2 |
| Sodium carboxymethyl cellulose | 0.5 |
| Acrylic-maleic copolymer (Sokalan ® CP-5) | 1.8 |
| Sodium silicate ($Na_2O:SiO_2$ = 1:2) | 5.0 |
| Sodium tripolyphosphate | 7.3 |
| **Stearyl hydroxyethyl imidazoline (Varine ® S) | 2.0 |
| Sodium sulfate | 12.697 |
| Sodium carbonate | 2.0 |
| Methyl silicone | 0.003 |
| Proteolytic enzyme (Alcalase ®) | 0.4 |
| Sodium perborate monohydrate | 13.6 |
| Hydroxylamine sulfate (perborate stabilizer) | 0.5 |
| Tixolex ® (ground clay flow aid) | 0.4 |
| Bentonite (swelling type) | 16.0 |
| Perfume | 0.6 |
| Potassium methyl siliconate | 0.3 |
| | 100.0 |

*Condensation product of mixed higher fatty alcohols of $C_{13-17}$ alkyls and about 11 moles of ethylene oxide
**Varine S, available from Sherex Chemical Company, Inc. It is 100% active material, is identified as H-Imidazole-1-Ethanol, Heptadecyl-4,5-Dihydro, and is over 90% cyclized.

In the above detergent composition formula the sodium sulfate and water are q.s., and can be varied correspondingly. Also, when any other composition components are to be charged, the filler content and/or the water content may be adjusted to compensate for such additions or changes.

The described composition, in particulate form, is of the type that has been characterized as a low phosphorus or low phosphate heavy duty detergent composition. To manufacture such composition an aqueous crutcher slurry of 60% solids content (the balance being water) is made and is mixed at a temperature of about 60° C., and is spray dried to substantially globular form in a conventional spray drying tower, in which the inlet air temperature is in the range of 200 to 500° C., preferably 300 to 400° C., and more preferably about 350° C. The spray dried particles resulting are cooled and are screened to be in the No's. 10 to 100 sieve size range (U.S. Sieve Series). The moisture content of the particles is 9%. The spray dried particles are then mixed with similarly sized (or sometimes smaller) particles of the proteolytic enzyme, perborate, perborate stabilizer, flow aid and bentonite (which may be agglomerated), and perfume and siliconate solution are sprayed onto the product while it is being mixed in a tumbling drum apparatus. The particulate product resulting is a commercially acceptable antistatic and fabric softening heavy duty (built) detergent composition of satisfactory antistatic characteristics and of improved detergency and fabric softening properties, when compared to a control composition of essentially the same formula but with a diquat, N-methyl-N-(2-hydroxyethyl)-N-tallow-alkyl-N'-methyl-N'-bis(2-hydroxyethyl)-propylene-diammonium methosulfate, replacing the stearyl hydroxyethyl imidazoline in the same proportion (2.0%). The "diquat formula" is made in essentially the same manner, with the diquat being spray dried from the described crutcher mix, but in that crutcher mix, to avoid inactivation of the diquat, the crutching time is minimized, being held to 15 minutes, instead of as long as an hour for the imidazoline formula) and the solids content of the crutcher mix is maintained at 65 or 70% instead of 60%.

The invented "imidazoline" and control "diquat" particulate detergent compositions, are both tested for fabric softening and detergency. In the tests of fabric softening capabilities a European type washing machine (Zanussi Z-960TX) is employed, the wash water in which is at 60° C. and such water is of a hardness of 200 p.p.m., as $CaCO_3$. The machine is charged with 3.5 kilograms of naturally soiled family laundry, which includes half cotton and half cotton/polyester blend fabrics, plus 22 artificially soiled (12×12 cm. each) swatches for soil removal evaluation, 12 unsoiled swatches (40×40 cm. each) for whiteness/redeposition evaluation, 8 unsoiled cotton terrycloth towels, and 4 unsoiled corduroy polyester-cotton swatches (40×40 cm. each) for softness evaluation. Both a pre-wash and a main wash are employed, in accordance with normal machine operations. The concentration of detergent compositions is about 1% (180 g. per load). After completions of washing and rinsing the softness tracers are line dried indoors under controlled conditions (20° C. and 60% relative humidity) and are evaluated for softness. Subsequently, the same tracers (for softness and whiteness/redeposition) are re-washed with a new soiled family laundry load and new artificially soiled swatches (for soil removal evaluation), according to the same procedure. A total of 3 washes and 3 evaluations are so carried out. The softnesses of the test towels are judged by an experienced panel of four judges, with the test specimens being identified by codes which are unknown to the judges. By such evaluations, the invented composition is found to be significantly more effective in softening the cotton and polyester-cotton fabrics than the control composition, in which the stearyl hydroxyethyl imidazoline is replaced by diquat.

For evaluation of fluffiness, the same washing process is followed but the load is different. It is only composed of 10 terrycloth towels which are previously hardened to meet real use conditions (treatment with calcium salts according to a standard test procedure). After completion of three washing cycles and final line drying, the towels are folded in eight and thicknesses of individual towels and heights of five folded towels in sets are measured (thicknesses and heights being indicative of fluffiness). By such testing the "experimental" towels are of heights at least 10% greater than those of "basic control" towels (such towels being those washed with a basic control detergent composition made without either the imidazoline or the diquat) and in fluffiness the towels washed with the imidazoline formula are equal to or better than the towels washed with the diquat formula product.

In detergency tests for soil removal and for soil anti-redeposition performance, utilizing both instrumental (reflectometer) and visual (four judges) evaluations, significant differences between test swatches washed with the imidazoline and diquat formulas are noted. Thus, when cotton (EMPA, stained with an oily carbonaceous soil simulating dirty motor oil) is washed according to the procedure previously described, in the European type washing machine, and is evaluated, compared to similar test swatches washed with the diquat formula, after one wash significant differences in whiteness are observed by a four judge panel experienced in visual evaluation of laundry for whiteness. Significant superiority in soil removal is also found by taking reflectometer readings of swatches washed in wash water at 60° C. containing 1% of the invented imidazoline detergent composition. After three washing cycles the average $\Delta R_d$ is 35.2 for the imidazoline-washed swatches and 23.8 for the diquat-washed swatches, which swatches were of cotton stained with Spangler soil. Such difference is known by experience to be very significant, and is in favor of the imidazoline formula. Corresponding $\Delta R_d$'s of 34.1 and 28.9 are obtained when the test swatches are of polyester/cotton blends soiled with Spangler soil. The corresponding $\Delta R_d$'s for EMPA cotton swatches are 34.4 for the imidazoline composition and 30.1 for the diquat composition and such figures are 41.8 and 38.5, respectively for EMPA polyester/cotton washed with imidazoline and washed with diquat. Thus, it is clear that unexpectedly beneficial improvements in detergency vs. oily and carbonaceous soils on both cotton and polyester/cotton blend fabrics has been established for the imidazoline detergent compositions over the diquat detergent compositions.

Both practical and instrumental testing for static charges on washed laundry that has been dried in an automatic laundry dryer prove the higher alkyl hydroxyethyl imidazoline (stearyl hydroxyethyl imidazoline) to be an effective antistat in the described laundry detergent compositions. Thus, compared to control compositions including the same components but no imidazoline, polyester, nylon and polyester/cotton laundry items washed with the invented compositions, and dried in an automatic laundry dryer, have noticeably less static charges thereon and are less likely to adhere to the person of a wearer of such laundered items (showing less static cling).

This example is representative of various experiments which establish that the invented detergent compositions are desirably antistatic and of good fluffing properties, and are unexpectedly beneficial with respect to the previous most preferred diquat detergent compositions in detergency (especially for oily soils) and fabric softening (especially for cotton). An additional benefit of the present formulations is that the imidazoline compounds, in addition to possessing better performance and processing characteristics, are also less expensive, so manufacturing costs can be kept down, or even better antistatic, fabric softening, detersive and fluffing actions can be obtained at the same cost by increasing the proportion of the imidazoline, compared to the diquat that it is replacing, which can be done at no increase in costs.

The above results are considered to be typical of those obtainable by employing the present higher alkyl and alkylaryl hydroxy-lower alkyl imidazolines (and salts thereof) in the described detergent compositions instead of the various diquats that are described in U.S. patent application Ser. No. 876,999, which application was previously referred to in this specification. Such desirable and unexpectedly beneficial results, especially improvements in fabric softening characteristics, are considered to be especially significant for such compositions that contain bentonite as a fabric softening or lubricating clay component. In the manufacture of such bentonite-containing compositions the bentonite may be incorporated in the crutcher mix, providing that the equipment available is capable of maintaining sufficient mixing activity (the bentonite tends to thicken the crutcher mix). However, it is preferred to post-add the bentonite, desirably as an agglomerate, with sodium sulfate or sodium carbonate being utilized in small proportion as a binder, and with the particles of the agglomerate being of about the same size as the spray dried particles.

In the above example the imidazoline component was homogeneously distributed throughout the spray dried particles by mixing it with other components in the crutcher, and such procedure is highly preferred for best antistatic, detersive and softening effects. However, if desired, the imidazoline compound may be melted or dissolved in a solvent or nonionic detergent, and sprayed onto the spray dried beads or onto a mixture of such beads and other components of the final product. Following such procedure the improvements in the described properties of the final composition will not be as great but improvements will be obtained, and therefore products made by such processes are within the scope of this invention.

EXAMPLE 2

In a laboratory experiment 146.4 grams of a crutcher mix for a high phosphate content built laundry detergent composition are made consisting of 12.6 grams of sodium linear tridecylbenzene sulfonate, 22.4 grams of sodium tripolyphosphate (containing a high level of Phase II), 5.6 grams of sodium silicate ($Na_2O:SiO_2 = 1:2.4$), 0.2 g. of fluorescent brightener (distilbene type), 26.3 g. of sodium sulfate (anhydrous) and 6.1 g. heat stable normal adjuvants for such built detergent compositions (which may include nonionic detergent, soap, sequestrant, sodium carboxymethyl cellulose, acrylic-maleic copolymer and supplemental builders, such as zeolite and carbonate), and 73.2 g. of water. Such crutcher mix, at a temperature of 60° C., is spray dried to particulate form (globular) in drying air at 400° C. (inlet), or to avoid the spray drying operation to save experimental time and effort, the crutcher mix may be employed directly in these laboratory washing and treating experiments. The crutcher mix described is the base crutcher mix and from it various experimental crutcher mixes may be made by the methods to be described herein.

In one experiment, designated 2a, 3 grams of tallowalkyl hydroxyethyl imidazoline (hereinafter referred to as THI) and 3 grams of water are added to such crutcher mix. In another experiment, designated 2b, 5 grams of THI and 5 grams of water are added to the 146.4 grams of such crutcher mix. In a third experiment 4.5 grams of distearyl dimethyl ammonium chloride (Arosurf® TA-100 MCV8, manufactured by Sherex Chemical Company, Inc.) are added to a spray dried product of the base crutcher mix, containing 8.5% of water (2c). When dried, the other crutcher mixes are dried to 8.5% moisture, too.

In an American style top-loading washing machine containing wash water at 100 p.p.m. hardness, as $CaCO_3$, and at a temperature of 49° C., 2.7 kg. of clean mixed laundry is washed with mixed synthetic organic polymeric plastic (polyester, nylon) swatches, swatches made of blends of polyester with cotton, and cotton terry wash cloths. After washing rinsing and line drying, the terry wash cloths are evaluated for softness, and after automatic laundry drying the other "static test swatches" are measured for electrical charges. On the scale of 1 to 10, with 10 being for almost perfect softening and 1 being for essentially no softening, the 2a composition is rated 8, the 2b composition is rated 9 and the 2c composition is rated 10. However, it should be considered that in the 2c composition the quaternary ammonium salt was not crutched in the presence of the anionic detergent, which adversely affects softening. With respect to static, the numbers are 24.8 kilovolts (kv.), 17.7 k and 10.5 kv., for 2a, 2b and 2c respectively. Again, had the quaternary ammonium chloride being present in the crutcher the voltage measured would have been considerably higher for 2c, with corresponding relative improvements for the experimentals.

In another set of experiments, using the same basic crutcher mix, fabric softening tests were run on the base beads (without THI and without quaternary ammonium salt), and compositions identified as 2d (made from the base crutcher mix to which 2 grams of THI and 2 grams of water were added), 2e (made from the base crutcher mix with 12 grams of bentonite [American Colloid] and 12 grams of water added), 2f (made from the base crutcher mix with 2 grams of THI, 12 grams of bentonite and 14 grams of water added), and 2g (made from the base crutcher mix with 2 grams of THI, 6 grams of bentonite and 8 grams of water added). Three cotton terry wash cloths were used in each test and washing was conducted in 100 p.p.m., (as $CaCO_3$) water at 27° C.

It was found that the control had a softness rating of 1 and such ratings for 2d-2g were 9, 8, 10+ and 10, respectively. The 10+ rating was for exceptionally good softness, beyond that usually obtainable.

From the results reported above it appears that the presence of THI very substantially increases the fabric softening effect of bentonite. Put another way, the addition of a small proportion of THI can allow the replacement of a much larger proportion of bentonite in detergent compositions, and still result in improved fabric softening.

Similar results have been obtained with low phosphate content synthetic organic detergent compositions, such as those described in Example 1, and in such cases comparatively low proportions of imidazoline compound of the type described in this specification, which do not in and of themselves improve fabric softness substantially in control compositions containing no fabric softener, substantially increase the fabric softening activity of bentonite, which is unexpected.

In a further experiment, designated 2h, 2 g. of THI and 2 g. of water are added to the base crutcher mix, the mix is dried and 2 g. of distearyl dimethyl ammonium chloride are post-added and are well mixed in with the spray dried beads. A synergistic improvement in fabric softening is obtained from such a combination of THI and quat so the described detergent composition is considered to be another significant advancement within this invention.

From this example it is evident that THI is compatible with both anionic and cationic components of detergent compositions, and its desirable antistatic and fabric softening effects are not diminished by such ionic materials. It has also been found to be compatible with various other "sensitive" components of detergent compositions, including bleach additives, such as TAED, which is an additional advantage of the invention, because cationic fabric softeners, as a rule, are not compatible with such sensitive materials.

EXAMPLE 3

| Component | Percent (by weight) |
| --- | --- |
| Sodium linear dodecylbenzene sulfonate | 5.0 |
| Nonionic detergent ($C_{13-17}$ alcohol/11 EtO) | 3.0 |
| Bentonite (swelling) | 8.0 |
| THI (T = stearyl) | 2.0 |
| Coco-tallow soap | 3.0 |
| Sodium silicate | 3.0 |
| Sodium tripolyphosphate | 35.0 |
| Sodium perborate | 15.0 |
| Sodium sulfate | 26 − X |
| Water and minor components | X (= 10 to 18) |

-continued

| Component | Percent (by weight) |
|---|---|
| | 100.0 |

The above formula is tested for fabric softening properties, utilizing cotton terry face cloths in a clean load of laundry, which is washed in a European type washing machine at 60° C., employing 1% concentration of the detergent composition (180 g.) in the wash water. Before testing begins the test cloths are hardened by a special treatment, (which has been described in Example 1). In the tests they are subjected to a main wash only (no pre-wash) but such wash is repeated twice, with softness being evaluated after each of the three washings and the following line dryings. For comparisons, the test is repeated with 16% of bentonite in the formula and with the sodium sulfate content being reduced by 8%. In another comparison bentonite is omitted entirely and the sodium sulfate content is increased to 16%.

Although the detergent composition containing 2% of stearyl hydroxyethyl imidazoline (SHI), with no bentonite, was significantly inferior to the other two compositions tested, in fabric softening effect, when such 2% of SHI was incorporated with 8% of bentonite it improved the fabric softening properties of the composition to equal those of the 16% bentonite formula after two and three washes, and it decidedly improved such fabric softening properties after only a single wash. Thus, although this comparison indicates that small proportions of SHI may not be sufficiently effective as a fabric softener for commercial acceptance in a detergent composition, such small proportions can synergistically improve the fabric softening properties of bentonite in such compositions and thereby allow significant reductions in the proportions of bentonite that would otherwise be required or would be desirably present in fabric softening detergent compositions.

EXAMPLE 4

| Component | Percent (by weight) |
|---|---|
| Sodium linear dodecylbenzene sulfonate | 7.0 |
| Nonionic detergent ($C_{13-17}$ alcohol-11 EtO) | 1.5 |
| Bentonite (swelling) | 16.0 |
| SHI (Rewopon ® V2548, from Rewo) | 2.0 |
| Coco-tallow soap | 3.0 |
| Sodium silicate | 3.0 |
| Sodium tripolyphosphate (TPP) | 35.0 |
| Sodium perborate monohydrate | 15.0 |
| Sodium sulfate | 17.5 − X |
| Water and minor components | X (= 8 to 16) |
| | 100.0 |

The above formula, with the spray dried portion thereof made in different orders of addition to the crutcher, with respect to the SHI and TPP (water, anionic detergent, soap, silicate and some adjuvants having been previously added), is tested against a control composition which is identical except for replacement of the SHI with an equal proportion of sodium sulfate. The materials spray dried correspond to those of Example 1, and the rest of the composition is post-added. Cleaning performances of the detergent compositions against stained cotton and polyester/cotton swatches are measured, using a reflectometer. The increase in reflectometer reading after washing the stained swatch is given a rating of 100 for the control, in each case, and on that basis ratings are given to the washings with the experimental formula compositions made, utilizing three different orders of addition. In the first order, which is the preferred embodiment of the manufacturing method of the present invention, the SHI is added to the crutcher after the TPP. Such addition may be made together with the nonionic detergent or the nonionic detergent may be added previously or subsequently. In the present experiment the order of addition is TPP, followed by nonionic detergent, followed by SHI, and such procedure will be identified as A. In the B procedure the nonionic detergent is added first, followed by the SHI, which is followed by the TPP. In the C procedure the SHI is added first, followed by the TPP and then the nonionic detergent.

The detergent compositions were tested for cleaning performance vs. EMPA, Spangler and Cecemel (milk and chocolate) stains on cotton and on polyester/cotton swatches. Table 1 details the percentage improvements in cleaning powers vs. the control.

TABLE 1

| MANUFACTURING PROCEDURE | PERCENTAGE IMPROVEMENTS IN CLEANING | | | | | | | |
|---|---|---|---|---|---|---|---|---|
| | EMPA Soil | | Spangler Soil | | Cecemel Soil | | Average | |
| | Cotton | PE/C | Cotton | PE/C | Cotton | PE/C | Cotton | PE/C |
| A | 80 | 43 | 27 | 17 | 47 | 28 | 51 | 29 |
| B | 37 | 6 | −8 | −16 | 27 | 6 | 19 | −1 |
| C | 42 | 33 | −3 | −9 | 48 | 20 | 29 | 15 |

From the table it is apparent that Procedure A is significantly superior to Procedures B and C and therefore it is concluded that it is desirable to add the SHI or other imidazoline to the crutcher mix after the TPP, rather than before it. The reasons for this appear to involve formation of an undesirable complex with other components of the crutcher mix when TPP is not present whereas when the TPP is in the crutcher mix it forms a complex with the imidazoline compound but that complex only loosely binds the imidazoline compound, and frees it in the wash water so that it may promote stain removal from soiled laundry.

EXAMPLE 5

In the various previously given examples the described components may be replaced with their equivalents, as taught in the preceding specification, and proportions of components may be varied ±10%, ±20% and ±25%, so long as they remain within the ranges mentioned in the specification, and the compositions produced will possess useful and often unexpectedly beneficial antistatic, fabric softening, cleaning and fluffing properties, as illustrated herein. Other imidazoline compounds of the types described herein, including hydroxypropyl and hydroxybutyl substituted imidazolines and those wherein the higher alkyl is palmityl, myristyl, cocoalkyl, tallowalkyl and H-tallowalkyl, and the higher alkylaryl is linear dodecylbenzene, may be employed. In some cases it is contemplated that additional relatively minor substitution, such as lower alkyl substitution, on the heterocyclic ring, may be present and instead of the hydroxylower alkyl substitution such may be a hydroxyethyl connected to the heterocyclic ring by means of ethylene oxide or polyethylene oxide. Additionally, instead of employing the imidazolines in such form they may be added to the crutcher mix as salts thereof, which are formed with acids, such as hydrochloric acid, lactic acid, sulfuric acid, methosulfuric acid and citric acid.

Sources of the mentioned imidazoline compounds, in addition to Sherex Chemical Company, Inc. which supplies Varine S, include Rewo (Germany) for Rewopon V2548 and V2549, and Mona Industries, Inc., for Monazoline ®PS. Various imidazolines from such manufacturers have been tested and of these it appears that the tallowalkyl- and stearyl hydroxyethyl imidazoline are superior and the best of these are those which are over 80% cyclized (and preferably the extent of cyclization is over 90%). Also, in preferred low phosphorus content built detergent compositions which may contain zeolite as a builder and which contain bentonite as a fabric softening agent, preferred contents of the imidazoline compound are about 1.5% and about 2%, both for American and European washing operations. Such small proportions of such relatively inexpensive (compared to diquats) material measurably improve important properties of the detergent composition without any detrimental effects resulting.

The invention has been described with respect to various illustrations and embodiments thereof but it is not to be limited to those because it is evident that one of skill in the art, with this specification before him, will be able to utilize substitutes and equivalents without departing from the invention.

What is claimed is:

1. An antistatic laundry detergent composition of improved detergency due to higher alkyl or alkylaryl hydroxyethyl imidazoline being a component thereof, which comprises a detersive proportion of a synthetic organic detergent, a building proportion of an inorganic or organic builder for the detergent, and an antistatic proportion of a higher alkyl or alkylaryl hydroxyethyl imidazoline of the formula

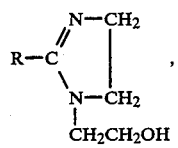

wherein R is an alkyl or alkylaryl of 8 to 24 carbon atoms.

2. An antistatic laundry detergent composition according to claim 1, which is in particulate solid form and wherein the synthetic organic detergent is a water soluble synthetic anionic organic detergent salt, the builder includes water soluble inorganic builder salt, and in the higher alkyl or alkylaryl hydroxyethyl imidazoline R is an alkyl of 12 to 18 carbon atoms.

3. An antistatic laundry detergent composition according to claim 2 wherein the anionic detergent is a sulfate, sulfonate, or mixtures thereof the builder salt includes water insoluble zeolite builder, and in the higher alkyl hydroxyethyl imidazoline R is saturated and of 16 to 18 carbon atoms.

4. An antistatic laundry detergent composition according to claim 3 wherein the anionic detergent is sodium linear alkylbenzene sulfonate in which the alkyl is of 12 to 13 carbon atoms, the builder comprises hydrated Zeolite A and sodium tripolyphosphate, and in the higher alkyl hydroxyethyl imidazoline R is stearyl.

5. An antistatic laundry detergent composition according to claim 4 which comprises a fabric softening proportion of bentonite.

6. An antistatic laundry detergent composition according to claim 1 which comprises 1 to 30% of the synthetic organic detergent, 5 to 60% of the builder for the detergent and 0.5 to 10% of the higher alkyl or alkylaryl hydroxyethyl imidazoline.

7. An antistatic laundry detergent composition according to claim 2 which comprises 2 to 30% of the water soluble synthetic anionic organic detergent salt, 5 to 60% of the water soluble inorganic builder salt and 0.5 to 10% of the higher alkyl hydroxyethyl imidazoline 8. An antistatic laundry detergent composition according to claim 3 wherein the anionic detergent is a sulfonate, and the composition comprises 4 to 20% of such anionic sulfonate detergent, 5 to 50% of the water soluble inorganic builder salt, 5 to 30% of the water insoluble zeolite builder and 1 to 7% of the higher alkyl hydroxyethyl imidazoline.

9. An antistatic laundry detergent composition according to claim 4 which comprises 5 to 12% of sodium linear alkylbenzene sulfonate in which the alkyl is of 12 to 13 carbon atoms, 5 to 30% of water soluble inorganic builder salt selected from the group consisting of sodium tripolyphosphate, sodium silicate and sodium carbonate, and mixtures thereof, 5 to 25% of hydrated Zeolite A builder and 1 to 4% of stearyl hydroxyethyl imidazoline.

10. An antistatic laundry detergent composition according to claim 5 which comprises 5 to 12% of sodium linear alkylbenzene sulfonate in which the alkyl is of 12 to 13 carbon atoms, 5 to 30% of water soluble inorganic builder salt selected from the group consisting of sodium tripolyphosphate, sodium silicate and sodium carbonate, and mixtures thereof, 5 to 25% of hydrated Zeolite A builder, 1 to 4% of stearyl hydroxyethyl imidazoline and 10 to 22% of bentonite.

11. An antistatic laundry detergent composition according to claim 10 which comprises about 7% of sodium linear dodecylbenzene sulfonate, about 7% of sodium tripolyphosphate, about 5% of sodium silicate of Na2O:SiO2 ratio of about 1:2, about 2% of sodium carbonate, about 16% of Zeolite A which is hydrated with about 20% thereof of water, about 2% of stearyl hydroxyethyl imidazoline and about 16% of bentonite, with the balance being selected from the group consisting of water, fillers and detergent composition adjuvants.

12. An antistatic laundry detergent composition according to claim 2 wherein the anionic detergent is a sulfate, sulfonate, or mixtures thereof the water soluble inorganic builder salt includes tripolyphosphate and in the higher alkyl hydroxyethyl imidazoline R is saturated and of 16 to 18 carbon atoms, and the proportions of such anionic detergent, tripolyphosphate and higher alkyl hydroxyethyl imidazoline are in the ranges of 2 to 30%, 10 to 60% and 0.5 to 10% respectively.

13. An antistatic laundry detergent composition according to claim 12 wherein the anionic detergent is sodium linear alkylbenzene sulfonate in which the alkyl is of 12 to 13 carbon atoms, and in the higher alkyl hydroxyethyl imidazoline R is stearyl, and the proportions of components therein are 2 to 25% of such sodium linear higher alkylbenzene sulfonate, 15 to 40% of sodium tripolyphosphate and 1 to 7% of such imidazoline.

14. An antistatic laundry detergent composition according to claim 13 which comprises 10 to 20% of sodium linear tridecylbenzene sulfonate, 15 to 30% of sodium tripolyphosphate and 2 to 7% of the imidazoline.

15. An antistatic laundry detergent composition according to claim 14 which comprises 5 to 22% of bentonite.

16. An antistatic laundry detergent composition according to claim 14 which comprises 1 to 5% of quaternary ammonium halide.

17. An antistatic laundry detergent composition according to claim 16 which comprises 2 to 4% of the imidazoline and 2 to 4% of distearyl dimethyl ammonium chloride.

18. A process for manufacturing a particulate antistatic laundry detergent composition which comprises making an aqueous crutcher mix of solid components of such detergent composition, which components include synthetic anionic organic detergent, zeolite and sodium tripolyphosphate builders for the synthetic detergent, and higher fatty alkyl or alkylaryl hydroxyethyl imidazoline, pumping the crutcher mix to a spray dryer and spraying such crutcher mix in the spray dryer and drying it in drying gas therein at elevated temperature; in which process, in the making of the crutcher mix the zeolite is added to water or to an aqueous composition containing non-phosphate and non-imidazoline components of the detergent composition prior to addition of sodium tripolyphosphate to such mix, the sodium tripolyphosphate is subsequently added to the crutcher and the imidazoline is added last after the sodium tripolyphosphate, thereby inhibiting reaction between the imidazoline and the zeolite.

19. A process according to claim 18 wherein the synthetic anionic organic detergent is sodium linear higher alkylbenzene sulfonate of 12 to 13 carbon atoms in the alkyl group thereof and the imidazoline is of the formula

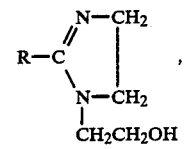

wherein R is linear alkyl of 16 to 18 carbon atoms, the solids content of the crutcher mix is in the range of 50 to 70% by weight, the temperature of the crutcher mix is in the range of 50 to 80° C. and the temperature of the drying air in the spray dryer is in the range of 200 to 500° C.

20. A process according to claim 19 wherein the proportions of sodium linear alkylbenzene sulfonate, zeolite, sodium tripolyphosphate and alkyl hydroxyethyl imidazoline are within the range of 1–30%, 5–30%, 5–50% and 0.5–10%, respectively, and the total proportion of zeolite and sodium tripolyphosphate is in the range of 10–60%.

21. An antistatic particulate detergent composition which comprises a detersive proportion of a synthetic anionic organic detergent, a building proportion of sodium tripolyphosphate or a mixture of sodium tripolyphosphate and zeolite, and an antistatic proportion of 1-hydroxy-lower alkyl-2-higher alkyl or alkylaryl imidazoline or a salt thereof.

22. A process for washing laundry which comprises washing it in an automatic washing machine in wash water containing 0.05 to 2% of a detergent composition according to claim 1 at a temperature in the range of 10 to 90° C. for from 5 to 60 minutes, and rinsing and drying the laundry.

23. A process according to claim 22 wherein the detergent composition is that of claim 8, the water soluble inorganic builder salt includes sodium tripolyphosphate, the water insoluble zeolite builder is a hydrated crystalline zeolite, and the detergent composition contains 10 to 22% of bentonite, the wash water temperature is in the range of 50 to 90° C., the concentration of detergent composition in the wash water is in the range of 0.5 to 2%, washing is in a European type washing machine and drying is line drying, whereby improved oily soil removal and fabric softening are obtained.

* * * * *